J. F. STEWARD.
STEREOSCOPES.
No. 171,061. Patented Dec. 14, 1875.
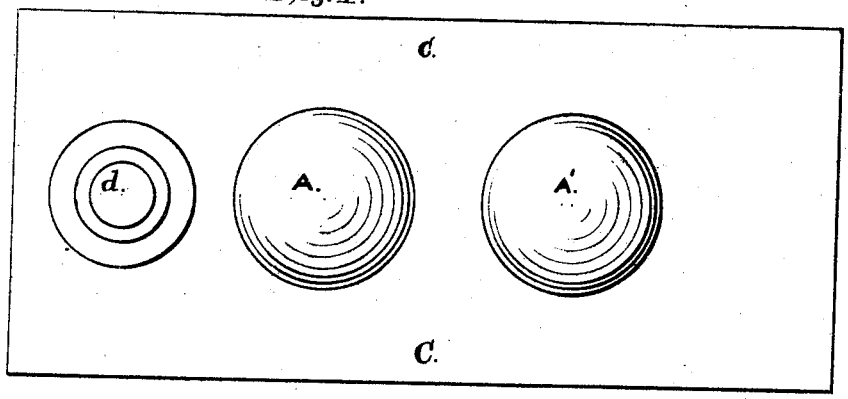
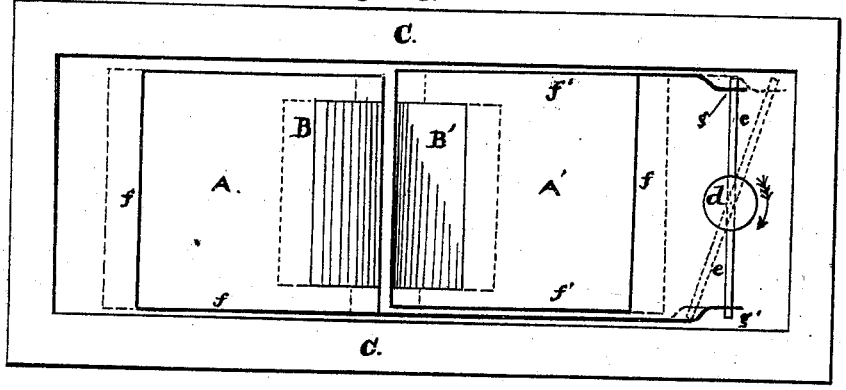
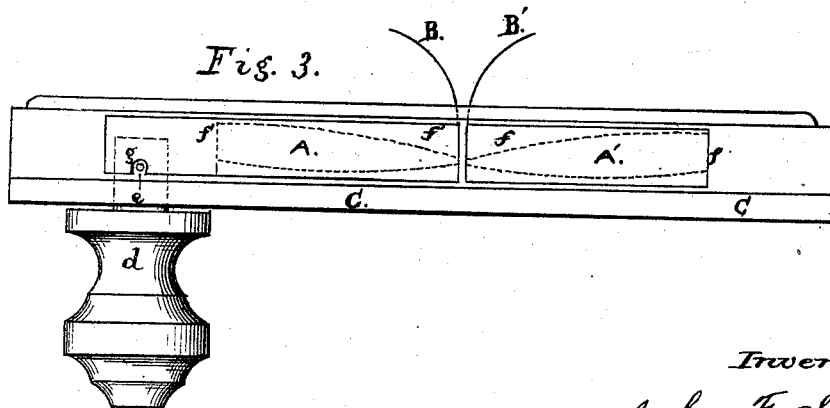
Witnesses:
J. F. Hollister,
Levi Flory
Inventor:
John F. Steward,

UNITED STATES PATENT OFFICE.

JOHN F. STEWARD, OF PLANO, ILLINOIS.

IMPROVEMENT IN STEREOSCOPES.

Specification forming part of Letters Patent No. 171,061, dated December 14, 1875; application filed July 24, 1875.

*To all whom it may concern:*

Be it known that I, JOHN F. STEWARD, of Plano, in the county of Kendall, State of Illinois, have invented a new and useful Improvement in Stereoscopes, of which the following is a full description, reference being had to the accompanying drawings, in which—

Figure 1 is a face view; Fig. 2, a back view; and Fig. 3 a top view.

My invention consists of a transverse adjustment of stereoscopic glasses.

In viewing stereographs through lensic prisms it is necessary that the prismatic focus of the two glasses shall coincide with the lensic foci, as the stereoscopic lenses are thinner at one edge, and the thinner edges are placed contiguous. As the lines of vision are made to strike nearer to the thinner edges the said lines are the more refracted, and thus made to cross each other before they reach the object of vision, thereby confusing the picture. Again, if the refraction is too little, (which it will be if the lines of vision pass through the thicker portions of the glasses, they being the less prismatic,) the images will not be thrown far enough to make them coincide; in other words, the lines of vision, if continued, will cross beyond the view, again confusing the picture.

As different individuals differ in width between the eyes, I have found it necessary to adjust the lenses to accommodate such differences, and my transverse invention does this by regulating the refraction. This may be accomplished by the following device, or any equivalent; and, further, as I find it necessary to adjust the lenses to the eyes, it is also desirable to adjust the width of the intercepter to the same. In order to confine each eye to its respective part of the view, I make said intercepter in two parts, attaching each half to its respective lens-frame.

A A', Figs. 1, 2, and 3, are the glasses. B B' are the intercepters. C, the frame; $d$, adjustment-knob; $e$, actuating bar, passing through the knob $d$, Figs. 2 and 3, with its ends inserted in the notches $g$ $g'$ of the extension of the glass-frames $f f'$, Figs. 2 and 3. In Fig. 2 the glass-frames are shown in their nearer relation to each other.

It will be seen that if the knob is turned in the direction indicated by the arrow the parts will be thrown into the position shown by dotted lines in Fig. 2. The intercepters B B', attached to the frames $f f'$, will also be moved simultaneously with them.

What I claim as my invention, and desire to secure by Letters Patent, is—

1. Stereoscopic glasses, made transversely adjustable, for the purpose specified, substantially as described.

2. The intercepters B B', in combination with the glasses A A', for the purpose specified.

JOHN F. STEWARD.

Witnesses:
J. F. HOLLISTER,
LEVI FLORY.